(12) United States Patent
Forgette et al.

(10) Patent No.: US 9,248,721 B1
(45) Date of Patent: Feb. 2, 2016

(54) SUN VISOR ASSEMBLY INCORPORATING A MAGNETIC DETENTION SYSTEM

(71) Applicant: FORD GLOBAL TECHNOLOGIES, LLC, Dearborn, MI (US)

(72) Inventors: Paul Alan Forgette, Brownstown, MI (US); Neal Randolph Osstyn, Royal Oak, MI (US); Anna Miller Hill, Belleville, MI (US); John Andrew Stakoe, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/576,447

(22) Filed: Dec. 19, 2014

(51) Int. Cl.
*B60J 3/02* (2006.01)
*B60R 13/02* (2006.01)

(52) U.S. Cl.
CPC .............. *B60J 3/0213* (2013.01); *B60J 3/0278* (2013.01); *B60R 13/0212* (2013.01); *B60R 2013/0287* (2013.01)

(58) Field of Classification Search
CPC .............. B60J 3/00; B60J 3/02; B60J 3/0204; B60J 3/0213; B60J 3/023; B60J 3/0278; B60J 3/0265; B60J 3/0269; B60J 3/0273
USPC .............................................. 296/97.1–97.13
See application file for complete search history.

(56) References Cited

U.S. PATENT DOCUMENTS

| 2,603,530 | A | | 7/1952 | Jones et al. |
|---|---|---|---|---|
| 2,802,693 | A | | 8/1957 | de S. Lauve |
| 2,855,242 | A | | 10/1958 | Holmes |
| 3,361,404 | A | | 1/1968 | Lohr |
| 3,825,296 | A | * | 7/1974 | Peterson .................... 296/97.13 |
| 4,248,474 | A | | 2/1981 | Mandrick |
| 4,353,593 | A | * | 10/1982 | Henson ........................ 296/97.6 |
| 4,394,043 | A | | 7/1983 | Moulding et al. |
| 4,570,991 | A | * | 2/1986 | Lystad ......................... 296/97.8 |
| 4,861,091 | A | | 8/1989 | Wallen |
| 4,993,471 | A | * | 2/1991 | Golden .................... 160/370.21 |
| 5,022,701 | A | * | 6/1991 | Thompson, II .............. 296/152 |
| 5,035,460 | A | * | 7/1991 | Huang ......................... 296/95.1 |
| 5,038,844 | A | * | 8/1991 | Edmonds et al. ........ 160/370.21 |
| 5,040,841 | A | | 8/1991 | Yang |
| 5,044,685 | A | * | 9/1991 | Yang ............................ 296/97.6 |
| 5,044,686 | A | * | 9/1991 | Acenbrack .................. 296/97.7 |

(Continued)

FOREIGN PATENT DOCUMENTS

EP 0096313 B1 10/1988
JP H07276981 A 10/1995

OTHER PUBLICATIONS

"Drooping Visors"; IH8MUD Forum, printed on Sep. 29, 2014; 11 pages; http://forum.ih8mud.com/threads/drooping-visors-9-repair-photos.609163/.

(Continued)

*Primary Examiner* — Gregory Blankenship
(74) *Attorney, Agent, or Firm* — Vichit Chea; King & Schickli, PLLC

(57) ABSTRACT

A sun visor assembly is provided incorporating a magnetic detention system. That assembly includes a sun visor body, a ferromagnetic element held in that body and a permanent magnet in a headliner of the vehicle. The permanent magnet and the ferromagnetic element are aligned so that the body is attracted toward the headliner and positively held in a home position adjacent the headliner.

17 Claims, 2 Drawing Sheets

(56) References Cited

U.S. PATENT DOCUMENTS

| | | | | |
|---|---|---|---|---|
| 5,314,226 | A | * | 5/1994 | Tovar ........................... 296/97.7 |
| 5,350,894 | A | | 9/1994 | Allison |
| 5,443,300 | A | * | 8/1995 | Mohammed ................. 296/97.4 |
| 5,472,255 | A | * | 12/1995 | Moore ......................... 296/97.6 |
| 5,810,419 | A | * | 9/1998 | Lam ............................ 296/97.1 |
| 5,810,421 | A | * | 9/1998 | Kalkman et al. ............. 296/97.5 |
| 6,523,880 | B1 | * | 2/2003 | Yako ........................... 296/97.1 |
| 6,909,408 | B2 | | 6/2005 | Matko et al. |
| 8,708,395 | B1 | * | 4/2014 | Kim ............................ 296/97.5 |
| 2002/0089208 | A1 | * | 7/2002 | Mashborn ..................... 296/97.1 |
| 2006/0103173 | A1 | * | 5/2006 | Schultz ......................... 296/214 |
| 2006/0181106 | A1 | * | 8/2006 | Willerton ..................... 296/97.5 |
| 2009/0045647 | A1 | * | 2/2009 | Whitlock ..................... 296/97.9 |
| 2011/0163568 | A1 | * | 7/2011 | Li et al. ........................ 296/97.9 |
| 2011/0254309 | A1 | * | 10/2011 | Visagie ........................ 296/97.6 |
| 2012/0256442 | A1 | * | 10/2012 | Rajsuman .................... 296/97.8 |

OTHER PUBLICATIONS

English machine translation of EP0096313.
English machine translation of JPH07276981.

* cited by examiner

SUN VISOR ASSEMBLY INCORPORATING A MAGNETIC DETENTION SYSTEM

TECHNICAL FIELD

This document relates generally to the motor vehicle equipment field and, more particularly, to a sun visor assembly incorporating a magnetic detention system.

BACKGROUND

Sun visors must maintain a sufficient retention force to overcome the weight of the sun visor blade or body and hold the sun visor against the headliner in the home or storage position. This is necessary in order to maintain the sun visor in place and prevent it from swinging down unintentionally from the home position. Less critically, a weak retention force also allows the visor to flutter when the vehicle shakes, creating an annoyance and a perceived lack of quality.

Current visor technology utilizes a leaf spring built into the visor support rod upon which the body is pivotally mounted to retain the sun visor in the home position. Such a construction is disclosed in, for example, U.S. Pat. No. 4,394,043 to Moulding et al. This strategy counters the weight of the visor body by applying a moment at the base of the visor body. Unfortunately, this method of retention generates significant bending stresses on the sun visor body forcing visor construction material and thickness selection.

The flaw with existing retention technology is that the retention forces are only applied at the rod. In cases where detention is the limiting factor on sun visor body stiffness applying a retention force at the end of the visor opposite the rod would enable thinner and lighter visor body construction. A further disadvantage to the existing technology is that the leaf spring retention mechanism is built for a specific angle at which the sun visor locks into detention so that it is held in the home position. Disadvantageously, a single vehicle program may need multiple sun visor retention spring designs to accommodate variations in headliner geometry which often varies, for example, from a standard roof vehicle to a vehicle incorporating a moon roof.

The sun visor that is the subject matter of this document incorporates a magnetic detention system so as to provide a retention force at the end of the sun visor body opposite the rod to thereby enable construction of the sun visor body from thinner and lighter materials. Further, the magnetic detention system is effective for maintaining a sun visor body in the home position over a wider range of geometries or configurations including for both standard roof and moon roof equipped vehicles.

SUMMARY

In accordance with the purposes and benefits described herein, a sun visor assembly is provided incorporating a magnetic detention system. That sun visor assembly comprises a sun visor body, a ferromagnetic element held in the body and a permanent magnet in a headliner of the vehicle. The permanent magnet and the ferromagnetic element are aligned so that the body is attracted toward the headliner and positively held in a home position adjacent the headliner. In this manner the sun visor body is stowed and held without vibrating and shaking thereby providing the perception of expensive, high-quality construction.

In one possible embodiment the sun visor assembly further includes a support rod and the body is pivotally received on the support rod. Further, the body includes a first end margin, a second end margin, a first longitudinal margin and a second longitudinal margin that define a complete perimeter of the body. The support rod is connected to the body adjacent a first corner where the first end margin meets the first longitudinal margin. In contrast, the ferromagnetic element is held in the body adjacent a second corner where the second end margin meets the second longitudinal margin.

In one possible embodiment the sun visor assembly further includes a second ferromagnetic element held in the body. The second ferromagnetic element is held in the body adjacent a third corner where the second end margin meets the first longitudinal margin. Further, the magnetic detention system for the sun visor assembly includes a second permanent magnet in the headliner. While the first permanent magnet is positioned in the headliner above a windshield of the vehicle, the second permanent magnet is positioned in the headliner above a side window of a vehicle. The second permanent magnet and a second ferromagnetic element are aligned whereby the body is attracted toward the headliner and positively held in a side window deployment position adjacent the headliner and the side window.

In one embodiment, the first and second ferromagnetic elements may be made from a material selected from a group of materials consisting of iron, nickel, iron alloy, nickel alloy, alnico outlet, dismantle alloy, permanently, magnetite, ferromagnetic rare earth alloys and mixtures thereof. In one particularly useful embodiment, the first and second ferromagnetic elements are made from a soft ferromagnetic material. Further the first and/or second permanent magnets may have an attractive force in a range of 10 to 40 Newtons.

Still further, in one possible embodiment an electronic device is carried in the sun visor body. That electronic device may be a wireless garage door opener. Advantageously, the ferromagnetic element(s) made from soft ferromagnetic material minimizes any chance of interference with or damage to any electronics provided in the sun visor body.

In the following description, there are shown and described several preferred embodiments of the sun visor assembly incorporating a magnetic detention system. As it should be realized, the sun visor assembly is capable of other, different embodiments and its several details are capable of modification in various, obvious aspects all without departing from the sun visor assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor assembly and together with the description serve to explain certain principles thereof. In the drawing figures.

Reference will now be made in detail to the present preferred embodiments of the sun visor assembly, examples of which are illustrated in the accompanying drawing figures.

DETAILED DESCRIPTION

Figure 1:
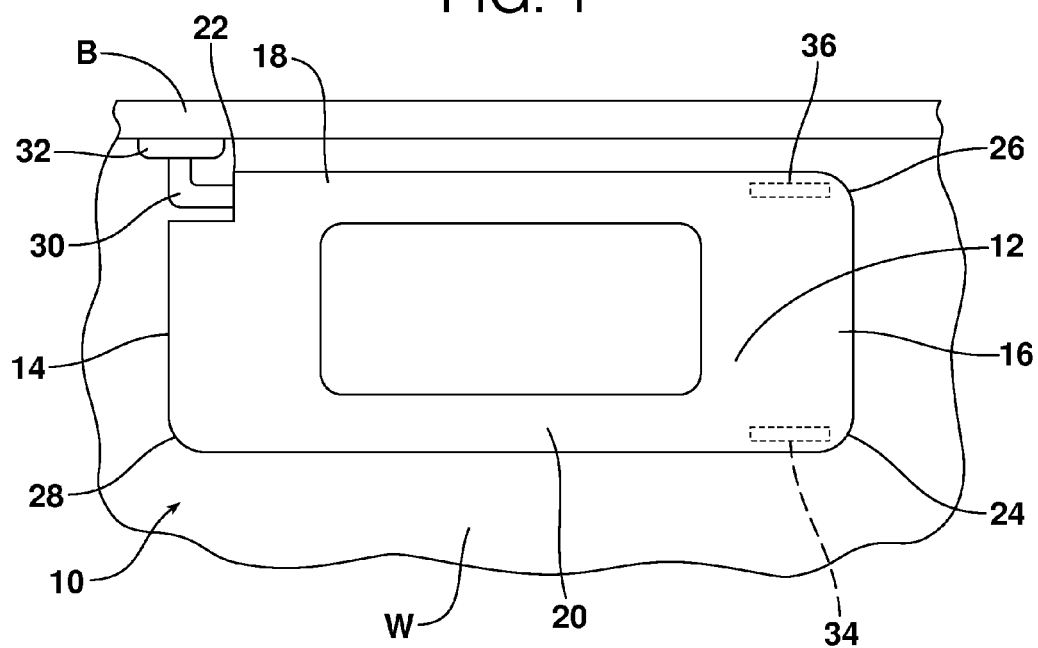
FIG. 1 is a schematic illustration of a sun visor assembly in a first use position extending downwardly from the vehicle headliner across the top portion of the vehicle windshield.
Figure 2:
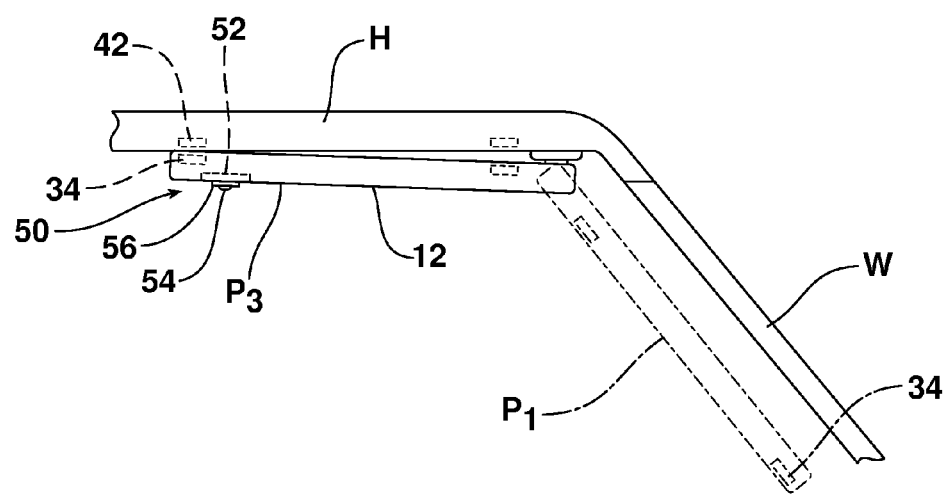
FIG. 2 is a schematic end view illustration showing the sun visor in the home or stowed position (note full line figure) and the first use position (note phantom line figure).
Figure 3:
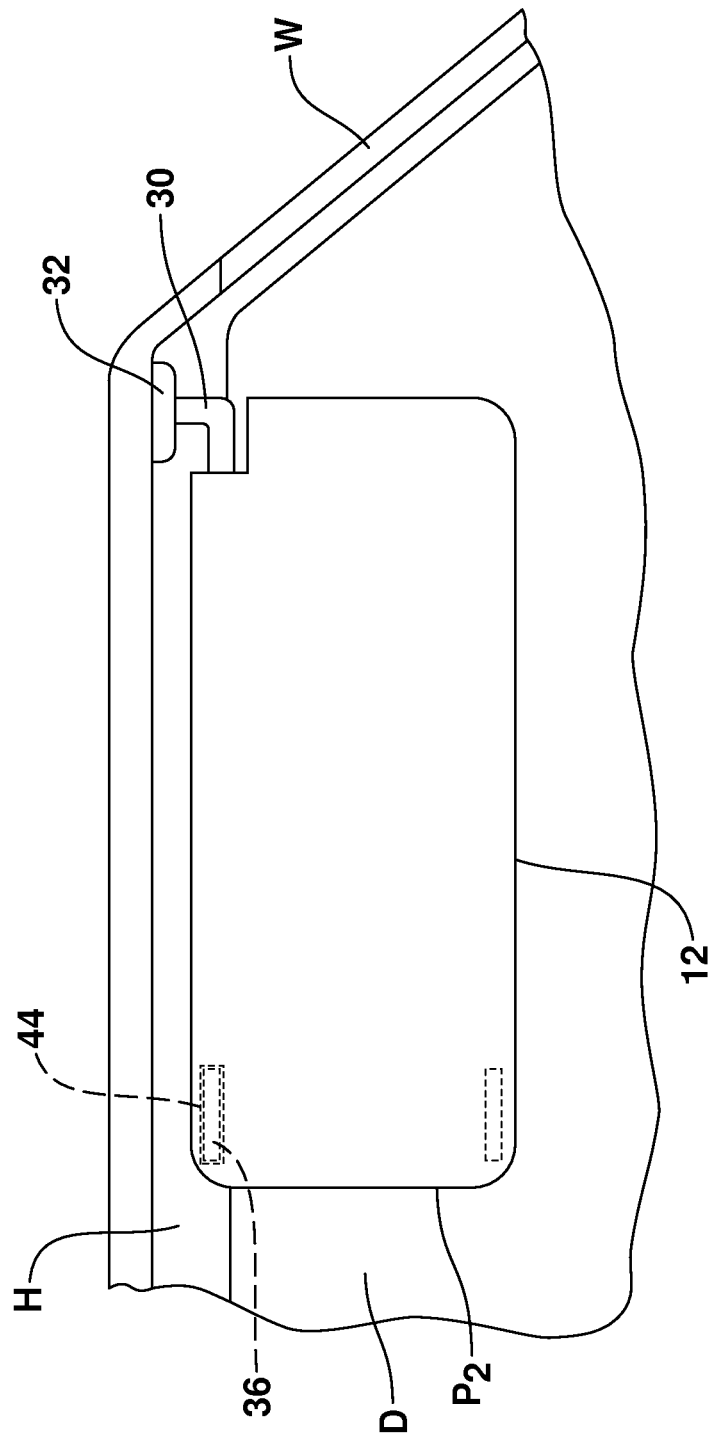
FIG. 3 is a schematic illustration of the sun visor in a second use position over a top portion of a side window (door window) of a motor vehicle.

Reference is now made to FIGS. 1-3 illustrating the sun visor assembly 10 incorporating a magnetic detention system. The sun visor assembly 10 includes a sun visor body 12 having a first end margin 14, a second end margin 16, a first longitudinal margin 18 and a second longitudinal margin 20. The first end margin 14 meets the first longitudinal margin 18 at a first corner 22. The second end margin 16 meets the second longitudinal margin 20 at a second corner 24. The second end margin 16 meets the first longitudinal margin 18 at a third corner 26. The first end margin 14 meets the second longitudinal margin 20 at a fourth corner 28. Thus, it should be appreciated that the first end margin 14, second end margin 16, first longitudinal margin 18 and second longitudinal margin 20 define a complete perimeter of the sun visor body 12.

The sun visor assembly 10 also has a support rod 30 pivotally mounted to a bracket 32 that secures the support rod to the body B of a motor vehicle. As should be appreciated, the sun visor body 12 is connected to the distal end of the support rod 30 adjacent the first corner 22. As best illustrated in FIGS. 1 and 3 respectively, the support rod 30 pivots in the bracket 32 between a first use position $P_1$ adjacent the front windshield W of the vehicle and a second user side window deployment position $P_2$ adjacent a side or door window D. Further, as illustrated in FIG. 2, the sun visor body 12 pivots on the distal end of the rod 30 so as to be displaceable between the home position $P_3$ adjacent the headliner H above the front windshield done W and the first use position $P_1$ where it is adjacent to and covers a top portion of the windshield W.

As further illustrated in the drawing figures, the sun visor assembly 10 includes a first ferromagnetic element 34 held in the body 12 adjacent the second corner 24 and a second ferromagnetic element 36 held in the body 12 adjacent the third corner 26. In one possible embodiment the ferromagnetic elements 34, 36 are secured in the body 12 between a rigid inner substrate and the outer "soft-touch" covering. More specifically, the ferromagnetic elements 34, 36 may be held in place by any appropriate means including, but not limited to, adhesive, hot stake welding and capture between the substrate and covering. While two separate ferromagnetic elements 34, 36 are illustrated, it should be appreciated that in one possible alternative embodiment, a single ferromagnetic element may be utilized so long as it extends between the second and third corner 24, 26.

As should be further appreciated from viewing FIG. 2, the magnetic detention system of the sun visor assembly 10 also includes a first permanent magnet 42 mounted in the vehicle headliner H above the front window W. As should be appreciated from viewing FIG. 3 a second permanent magnet 44 is mounted in the headliner H above the side door window D. More specifically, the first permanent magnet 42 is mounted in the headliner H at a location where it will be aligned with the first ferromagnetic element 34 in the sun visor body 12 when the sun visor is in the home or stowed position $P_3$. In this way, the first permanent magnet 42 and the first ferromagnetic element 34 are within close enough proximity to one another for the first permanent magnet 42 to produce a force of attraction with respect to the first ferromagnetic element 34 sufficient to bias and hold the sun visor body 12 in the home position $P_3$. In the most preferred embodiment, the first permanent magnet 42 provides an attractive force in the range of 10 to 40 Newtons so that the sun visor body 12 is positively held in the home position $P_3$ so as to prevent any fluttering of the body 12 during operation of the vehicle.

Similarly, illustrated in FIG. 3 the second permanent magnet 44 is located in the headliner H above the side or door window D so as to be aligned with the second ferromagnetic element 36 when the sun visor body 12 is in the second use position $P_2$ overlying an upper portion of the side or door window D. More specifically, when the sun visor body 12 is in the second use position $P_2$, the second permanent magnet 44 is sufficiently close to the second ferromagnetic element 36 to provide a force of attraction sufficient to hold the sun visor body 12 in the second use position $P_2$. Toward this end, the second permanent magnet 44 produces an attractive force in a range of 10 to 40 Newtons which is sufficient to hold the sun visor body in the position $P_2$ and prevent any vibration or fluttering.

As further illustrated in drawing FIG. 2, an electronic device 50 may be carried in the sun visor body 12. In the illustrated embodiment, the electronic device 50 comprises a universal garage door opener including a transmitter 52 hidden in the body 12 and actuator buttons 54 that allow operation of the garage door opener and project from the housing 56 so that they may be readily accessed. Of course it should be appreciated that other electronic devices may be provided in the body 12. These include, but are not necessarily limited to, a microphone for a vehicle voice recognition system.

The first and second ferromagnetic elements 34, 36 provided in the visor body 12 may be made from a material selected from a group of materials consisting of iron, nickel, iron alloy, nickel alloy, alnico alloy, bismanol alloy, permalloy, magnetite, ferromagnetic rare earth alloys and mixtures thereof. In one particularly useful embodiment, the ferromagnetic elements 34, 36 are made from a soft ferromagnetic material.

Soft ferromagnetic materials are characterized by their inability to retain the magnetism induced by a field when the field is removed: that is the magnetic domains in the soft ferromagnetic materials simply randomize again. Accordingly, when the visor body 12 is displaced from the home or stowed position $P_3$ toward the first use position $P_1$ in order to access the buttons 54 of the electronic device 50, the ferromagnetic element 34 is removed from the magnetic field of the permanent magnet 42 and the magnetism induced by that field in the element dissipates.

Soft ferromagnetic materials useful in the construction of the ferromagnetic elements 34, 36 include, but are not necessarily limited to annealed iron, permalloy, Fe—Si alloys, sendust, spinel ferrites and combinations thereof.

In summary the sun visor assembly 10, incorporating a magnetic detention system as described including the first and second ferromagnetic elements 34, 36 in the sun visor body 12 and the first and second permanent magnets 42, 44 in the headliner H, provides a number of benefits and advantages. These include the provision of a sun visor body retention force at the end of the visor body diagonally opposite the connection to the support rod 30 so as to more effectively hold the sun visor body 12 in the home position $P_3$ and the second use position $P_2$ while preventing vibration and flutter. Further, by providing a retention force at the corner 24 of the visor body 12 opposite the support rod 30, a lighter duty retention spring may be used and the visor body may be made thinner and of lighter weight material with an associated reduction in production costs. Advantageously, this is achieved while providing the previously noted damping of vibration and flutter which gives the impression of a high quality construction. Still further, by using ferromagnetic elements 34, 36 in the sun visor body 12 instead of permanent magnets, potential interference and damage to electronic equipment 50 provided in the sun visor body 12 is fully avoided.

The foregoing has been presented for purposes of illustration and description. It is not intended to be exhaustive or to limit the embodiments to the precise form disclosed. Obvious modifications and variations are possible in light of the above teachings. For example, while the ferromagnetic element 34 is provided in the second corner 24 in the illustrated embodiment, it should be appreciated that it is possible to provide it anywhere along the margin 20. All such modifications and variations are within the scope of the appended claims when interpreted in accordance with the breadth to which they are fairly, legally and equitably entitled.

What is claimed is:

1. A sun visor assembly incorporating a magnetic detention system, comprising:
   a support rod;
   a sun visor body pivotally received on said support rod, said sun visor body including a first end margin, a second end margin, a first longitudinal margin and a second longitudinal margin defining a complete perimeter of said sun visor body and wherein said support rod is connected to said sun visor body adjacent a first corner where said first end margin meets said first longitudinal margin;
   a ferromagnetic element held in said sun visor body adjacent a second corner where said second end margin meets said second longitudinal margin; and
   a permanent magnet in a headliner, said permanent magnet and said ferromagnetic element being aligned whereby said sun visor body is attracted toward said headliner and positively held in a home position adjacent said headliner.

2. The sun visor assembly of claim 1, wherein said ferromagnetic element is made from a material selected from a group of materials consisting of iron, nickel, iron alloy, nickel alloy, alnico alloy, bismanol alloy, permalloy, magnetite, ferromagnetic rare earth alloys and mixtures thereof.

3. The sun visor assembly of claim 1, further including a second ferromagnetic element held in said body.

4. The sun visor assembly of claim 3, wherein said second ferromagnetic element is held in said body adjacent a third corner where said second end margin meets said first longitudinal margin.

5. The sun visor assembly of claim 4, further including a second permanent magnet in said headliner.

6. The sun visor assembly of claim 5, wherein said permanent magnet is in said headliner above a windshield of said vehicle and said second permanent magnet is in said headliner above a side window of said vehicle.

7. The sun visor assembly of claim 6, wherein said second permanent magnet and said second ferromagnetic element are aligned whereby said body is attracted toward said headliner and positively held in a side window deployment position adjacent said headliner and said side window.

8. The sun visor assembly of claim 7, wherein said ferromagnetic element and said second ferromagnetic element are made from a material selected from a group of materials consisting of iron, nickel, iron alloy, nickel alloy, alnico alloy, bismanol alloy, permalloy, magnetite, ferromagnetic rare earth alloys and mixtures thereof.

9. The sun visor assembly of claim 7, wherein said ferromagnetic element is made from a soft ferromagnetic material.

10. The sun visor assembly of claim 9, wherein said soft ferromagnetic material is selected from a group of materials consisting of annealed iron, permalloy, Fe—Si alloys, sendust, spinel ferrites and combinations thereof.

11. The sun visor assembly of claim 9, wherein said permanent magnet has attractive force in a range of 10 to 14 Newtons.

12. The sun visor assembly of claim 11, wherein said second permanent magnet has an attractive force in a range of 10 to 40 Newtons.

13. The sun visor assembly of claim 12, wherein an electronic device is carried in said body.

14. The sun visor assembly of claim 13, wherein said electronic device is a wireless garage door opener.

15. A sun visor assembly incorporating a magnetic detention system, comprising:
    a sun visor body;
    a ferromagnetic element made from a soft ferromagnetic material held in said sun visor body; and
    a permanent magnet in a headliner, said permanent magnet and said ferromagnetic element being aligned whereby said sun visor body is attracted toward said headliner and positively held in a home position adjacent said headliner.

16. The sun visor assembly of claim 15, wherein said soft ferromagnetic material is selected from a group of materials consisting of annealed iron, permalloy, Fe—Si alloys, sendust, spinel ferrites and combinations thereof.

17. A sun visor assembly incorporating a magnetic detention system, comprising:
    a support rod;
    a sun visor body pivotally received on said support rod, said sun visor body including a first end margin, a second end margin, a first longitudinal margin and a second longitudinal margin defining a complete perimeter of said sun visor body and wherein said support rod is connected to said sun visor body adjacent a first corner where said first end margin meets said first longitudinal margin;
    a ferromagnetic element, made from a soft ferromagnetic material, held in said sun visor body; and
    a permanent magnet in a headliner, said permanent magnet and said ferromagnetic element being aligned whereby said sun visor body is attracted toward said headliner and positively held in a home position adjacent said headliner.

* * * * *